May 17, 1960
T. L. SCHILLING
2,936,586
AFTERBURNER IGNITION SYSTEM
Filed March 21, 1955
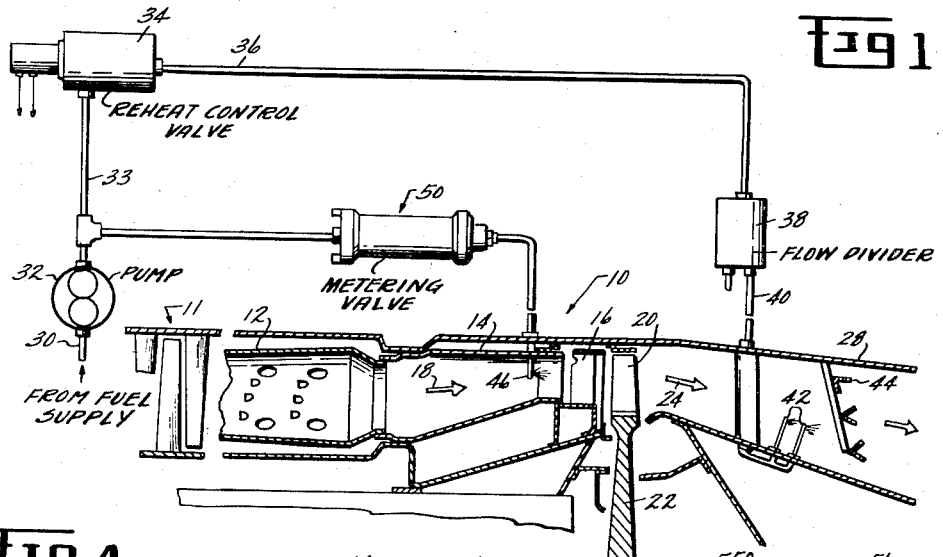
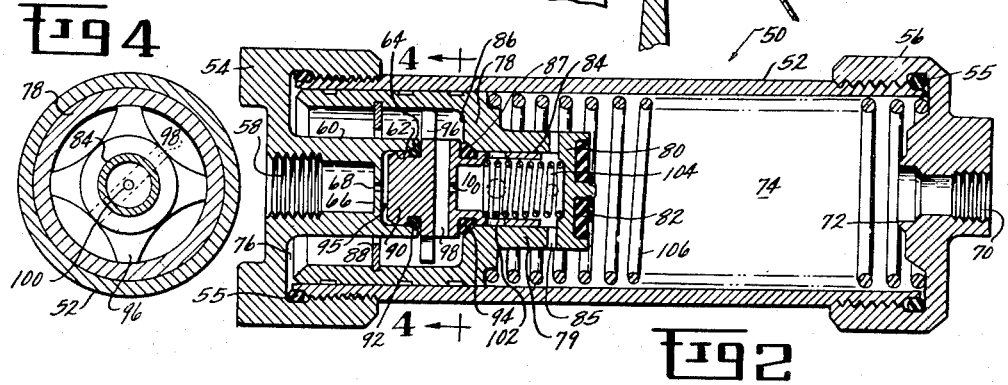
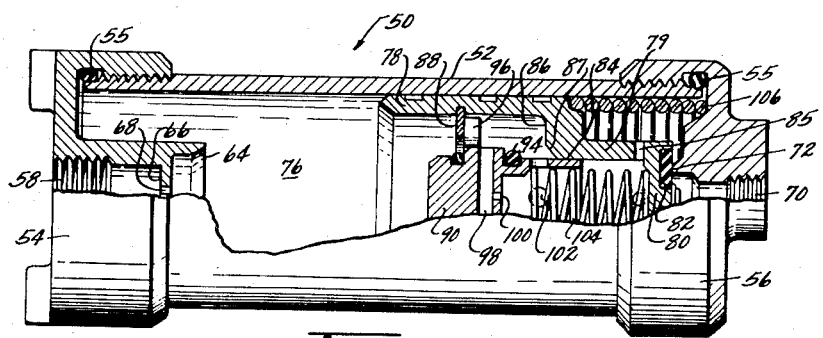
INVENTOR.
THOMAS L. SCHILLING
BY
Edward M. Tittle
HIS ATTORNEY

2,936,586
Patented May 17, 1960

2,936,586

AFTERBURNER IGNITION SYSTEM

Thomas Leroy Schilling, Cincinnati, Ohio, assignor to General Electric Company, a corporation of New York Application March 21, 1955, Serial No. 495,669

1 Claim. (Cl. 60—39.82)

This invention relates to turbomachines and in particular to a fuel metering valve for use to ignite the reheat fuel in an afterburner of a turbomachine during reheat operation.

In general, in a turbojet engine, or the like, in which reheat operation is performed with the use of an afterburner, ram air is taken in through the compressor inlet of an axial flow or centrifugal compressor and compressed through the various stages therein. Fuel from the main fuel system is injected into the air in the combustion chambers where it is ignited. The hot gases upon leaving the combustion chambers are next directed through transition liners which are connected to an annular stationary set of nozzle partitions. Here the gas stream is deflected at a predetermined angle in such a manner that the velocity of the gas is increased. As the motive fluid continues to pass downstream through the turbine buckets, sufficient energy is taken from the motive fluid to drive the turbine wheel which in turn drives the compressor. Since the temperatures at the turbine are relatively high, a great excess of air is required to maintain the temperature of the motive fluid at a sufficiently low temperature to provide the hot parts with sufficiently long life without decreasing from the efficiency of the engine or the thrust which could be obtained at higher temperatures. This cooling air is supplied at high pressure and is generally bled from the compressor so that a large portion of the motive fluid passing downstream contains unburned air which would not normally contribute substantially to the thrust. Therefore, the excess unburned air is mixed with additional fuel in the after burner for burning the unburned oxygen. This imparts additional energy to the motive fluid thereby increasing the thrust of the engine without appreciably adding to the weight of the engine. The use of an afterburner to burn the excess oxygen is called reheat operation. Since reheat operation consumes exceedingly more fuel than normal operation, and since the temperatures generated are much higher thereby cutting down the engine life, it is only used intermittently to obtain sudden bursts of speed, and for emergency operation. Since it is generally used only in limited instances mainly for emergency operation, it is necessary that the reheat fuel injected into the afterburner can be relied upon to be ignited at such times. It has been found that prior methods of lighting off this reheat fuel have been inconsistent, thereby not providing the additional thrust required at the required moment so as to eliminate the emergency that might exist, thereby defeating the very purpose of reheat operation. It is therefore a general object of this invention to obviate the above difficulty by providing a means for consistently lighting off reheat fuel for an afterburner during emergency operations.

One of the other known methods for obtaining reheat ignition, that is, for lighting off the reheat fuel, is a spark ignition system similar to that used in the main burners of a turbojet engine. The spark plugs used in conjunction with a spark coil and vibrator, are mounted in the tail cone to ignite the reheat fuel. It was found however that the use of spark ignition was found to be no better, or no more dependable, than no spark ignition system at all. This is explained by the fact that the heat of the combustion gases passing downstream through the turbine is sufficiently hot to sometimes ignite the reheat fuel even without a spark plug. This system of igniting the reheat fuel did not prove satisfactory, since at high altitudes low ram air conditions exist and the spark ignition system for reheat operation was ineffective in obtaining the necessary rapid light off. It is therefore an object of this invention to provide an ignition system for lighting off the reheat fuel in the afterburner of a turbojet engine at high as well as low altitudes.

It is another object of this invention to provide a means for injecting a small quantity of fuel upstream of the turbine of a turbojet engine, which is ignited spontaneously since the main combustion gases are sufficiently hot to light off the small quantity of fuel, which small quantity of fuel acts as a torch in igniting the reheat fuel in the afterburner during reheat operation.

In order to provide a small quantity of fuel capable of being ignited by the hot gases of the main combustion system so as to form a hot streak, it is necessary to provide a means for supplying the correct quantity of hot streak fuel into the system for a predetermined sufficient length of time to light off the reheat fuel and then to automatically shut off. Unless the amount of fuel used for hot streak ignition is very carefully injected, continuous operation of this hot streak for any length of time will result in damage to the nozzle diaphragm and turbine wheel. It is therefore still another object of this invention to provide a means for injecting a hot streak of flame through the turbine of a turbojet engine and to automatically shut the flame off after the reheat fuel has lit off.

It is a still further object of this invention to provide a hot streak ignition system for lighting off the reheat fuel in the afterburner of a turbojet engine, the hot streak ignition system being created by supplying a small amount of fuel upstream of the turbine where the temperatures of the motive fluid emanating from the main combustion chambers are sufficiently high to ignite the small quantity of fuel, the amount and time of the small quantity of fuel being injected into the motive fluid being controlled by a metering valve, which metering valve has a quick return feature to permit another attempt at lighting off the reheat fuel in the shortest time possible in the event that the first attempt has failed to light off the reheat fuel.

These and other objects will become more apparent when read in the light of the accompanying specification and drawing, wherein like parts have like numbers, and wherein the parts are designated by specific names but are intended to be as generic in their application as the prior art will permit, and wherein;

Figure 1 is a cross-sectional view of the combustion system, turbine and reheat apparatus in the afterburner which include the reheat fuel and hot streak ignition system, Figure 2 is a cross-sectional view of the metering valve, Figure 3 is a cross-sectional view of the metering valves showing the metering valve in its operative position with the valve automatically shutting off the hot streak fuel, Figure 4 is a cross-sectional view of the metering valve taken on lines 4—4 of Figure 2.

Briefly stated, in accordance with one aspect of my invention, a means is provided for lighting off the reheat fuel in an afterburner of a turbojet engine to burn the unburned oxygen in the motive fluid thereby providing additional thrust to the engine. The means for lighting off the reheat fuel includes a metering valve for injecting a small quantity of fuel through an ejector nozzle positioned upstream of the nozzle diaphragm and turbine.

The small quantity of fuel is ignited by the hot combustion gases from the main combustion system so as to form a hot streak passing through the nozzle diaphragm and turbine buckets. This hot streak passes downstream to ignite the reheat fuel being injected into the afterburner for reheat operation. The small quantity of fuel is automatically measured by the metering valve, which valve also automatically controls the time the small quantity of fuel is injected into the hot gases from the main combustion system. A quick return feature is provided in the metering valve to quickly ready the metering valve for another cycle.

Referring to the drawings and in particular to Figure 1, portions of a turbojet engine is generally designated at 10. The portions shown is an axial flow compressor 11, combustion chamber 12 which can either be of the annular or cannular type in so far as this invention is concerned, and a transition liner 14 located between the combustion chamber and the nozzle diaphragm 16. The hot gases emanating from the combustion system 12 are shown at 18 passing downstream through the nozzle diaphragm 16 and turbine buckets 20 of turbine wheel 22. The hot gases are then shown passing downstream at 24 through the tailpipe 26. A normal type afterburner is shown at 28 which is secured to the tailpipe 26 by any well-known method, such as by flanges bolting through or by welding.

Whenever it is desirable to go on reheat and supply reheat fuel to the afterburner, the pilot operates the throttle (not shown) for reheat operation. This operates a pump 32 which takes fuel from conduit 30 leading to a source of fuel and delivers the fuel under pressure to a conduit 33.

Therefore, the pump 32 supplies reheat fuel under pressure to the reheat control valve 34 which can be of any conventional type so long as it provides the proper amount of reheat fuel for any given flight condition, and which forms no part of this invention. During reheat operation for thrust augmentation, fuel flows from the reheat control valve through conduit 36 into the flow divider 38. The flow divider divides the flow into two sets of nozzles. The conduit 40 from the flow divider 38 is shown connected to a plurality of fuel nozzles 42 shown extending into the stream of the hot gases, in the afterburner 28. In order to hold the flame in the afterburner, a flame holder 44 is provided. The purpose of the flameholder 44 is to slow down the velocity of portions of the hot gas stream to give the reheat fuel an opportunity to be ignited within the afterburner instead of possibly being ignited outside of the afterburner thereby not providing the additional thrust desired.

In order to insure the ignition of the reheat fuel, an ignition nozzle 46 is provided through which a small quantity of fuel is injected into the hot gases emanating from the main combustion system at 12. This nozzle 46 is positioned upstream of the turbine and nozzle diaphragm since this is one of the hottest locations in the turbojet engine. This insures that the small quantity of fuel being injected will become ignited and form a hot streak as shown at 24. The small quantity of fuel is bled off from the conduit 33 through the metering valve generally designated at 50.

The valve 50 comprises a cylinder 52 closed at both ends by caps or the like 54 and 56. O-rings 55 are provided to seal the metering valve. Cap 54 has a threaded opening 58 which serves as an inlet to receive fuel from a conduit leading from the pump 32. The cap 54 is further provided with a centrally positioned boss 60 extending to the inside of the cylinder 52. The boss 60 terminates into a cylinder 62 with a valve seat 64 at the marginal edges thereof. A partition 66 extends across the cylinder 62 and is provided with a small aperture 68.

The cap 56 is provided with a centrally positioned threaded opening 70 which serves as an outlet to a conduit for leading the fuel to the ignition nozzle 46.

The marginal edges defining the opening 70 are provided with a flange extending into the cylinder 52 to provide a valve seat 72.

The cylinder 52 is divided into chambers 74 and 76 by a piston 78 which is slidably mounted in the cylinder 52. The piston 78 is hollow being closed at a necked down portion 79 at one end as shown at 80. The closed end 80 is provided with a rubber or other valve member 82 for seating on the valve seat 72. The necked down portion 79 is also hollow so as to form a cylindrical surface 84 on the inside thereof. A plurality of openings 85 are formed in the hollow necked down portion 79 to provide communication between chambers 76 and 74. The necked down portion 79 forms an abutment or shoulder 86 on the inside of the piston 78. The abutment or shoulder 86 is provided with a valve seat 87. A snap ring or the like 88 is positioned on the inside of the hollow piston. The abutment or shoulder 86 and the snap ring 88 provide the limit of travel of a poppet 90 slidably mounted in the cylindrical surface 84.

The poppet 90 provides the quick return feature to the piston 78 so that the cycle of readying for another reheat light off can be accomplished in a relatively short time. The poppet 90 is provided with O-rings as shown at 92 and 94 for sealing off the respective chambers when the poppet is seated. The poppet has a pressure area 95 exposed to the aperture 68. Extending outwardly from the poppet 90 are a plurality of arms or the like 96 (Fig. 4) adapted to engage the snap ring 88 at one limit of movement of the poppet. The spaces between the arms 96 permit intermittent communication between aperture 68 and the transverse passageway 98 in the poppet. Another aperture 100 is provided, the purpose of which will hereinafter be more fully explained. The walls of the poppet are further provided with a plurality of openings 102 which are larger than the openings 85 in the piston, the purpose of which will also hereinafter be more fully explained. Coil spring 104 normally biases the poppet 90 to the left. Also, the coil spring 106 normally tends to bias the piston 78 to the left.

*Operation*

In order to operate the engine on reheat to provide additional thrust, the throttle is advanced by the pilot to the reheat region to actuate the pump 32 to supply reheat fuel to the reheat control valve 34. At the same time the pressure of the fuel is also supplied at the inlet 58 of the metering valve 50. As the fuel passes through the opening 68 pressure exerted by the fuel begins to build up on the surface 95 of the poppet 90. As the pressure builds up the poppet 90 begins to move to the right in contact with seat 87. The pressure build up will then tend to force the piston 78 to the right to begin its downward stroke. When the poppet 90 clears the cylindrical portion 62 in the cap 54, communication is established between the orifice 68 and the chamber 76 in the hollow piston 78 and cylinder. Since the transverse opening 98 is in communication with the chamber 76 of the hollow piston 78, fuel can flow through the orifice 100 to the openings 85 to the chamber 74 to permit fuel to flow through the outlet 70. Since the orifice 85 is much larger than the orifice 100 the entire pressure drop from the chamber 76 to the chamber 74 acts on the pressure area defined by seat 87 and maintains the poppet 90 in contact with the seat 87 on the piston 78. It is noted that the poppet and the piston move down as a unit with the entire pressure drop acting on the whole piston 78. It is noted that since the orifices 68 and 100 are sized such that flow in orifice 68 is greater than flow out of orifice 100 the fuel builds up in the chamber 76 in the hollow piston 78 and causes the piston to move to the right at a rate determined by the difference in flow rates through the orifices 68 and 100 until such time as the piston moves far enough to seat on the valve seat 72 on the cap 56. The flow of fuel out through orifice 100 along with the fuel displaced by the piston passes out through the igniter nozzle 46 located on the turbine casing and extending through the transition liner. When the end 80 is seated at 72 the hot streak flow is shut off and the entire pressure exerted by the reheat fuel pump 32 through the metering valve inlet 58 acts on the area defined by the valve seat 72 and holds the piston 78 down against the spring 106 until the pump 32 is shut down and the pressure removed. When the piston 78 is seated and there is no flow through orifice 100 a pressure drop no longer exists across the poppet, the pressures in chambers 74 and 76 being the same, and the spring 104 exerts sufficient force to move the poppet against the abutment or snap ring 82.

The openings 102 are larger than the openings 85. Therefore, whenever the pressure is relieved, the big openings 102 permit all of the fluid that was on the left side of the piston or in chamber 76 to pass through the openings to the chamber 74. When the poppet is seated on the valve seat 64, hot gases are prevented from bleeding back into the fuel system. The sizing of the openings enables the piston to return to its normal position in a relatively short time since the fluid can be transposed very quickly. This arrangement permits the cycle to be accomplished immediately in the event ignition of the reheat fuel didn't take place. The length of time for the piston to move from left to right is much longer than for the piston to move from right to left. The length of time the piston travels in going from left to right so as to be seated depends on the pressure of the fuel and the size of the orifices 68 and 100. However, in returning to its normal position the length of time is governed merely by the ability to transpose the fuel from the chamber 76 to the chamber 74, and this is done by the larger openings at 102. This supplies the metering valve with a quick return feature on the piston. At high altitudes where ignition is difficult the pressure of the fuel and also of the hot gases is lower. Therefore at higher altitudes the time the hot streak ignition is on is longer since the pressures acting on the poppet and piston are smaller. This necessitates a longer time for the piston in going from left to right and is very desirable. This permits sufficient time for the reheat fuel to light off at the higher altitudes. At lower altitudes the pressures are higher and therefore does not require as much time to light off with a concurrent shorter time for piston travel. In other words, the higher the pressure drop across the piston, the quicker it will move and accordingly the lower the pressure drop the slower it will move. This is a decided advantage since the hot streak ignition stays on only so long as is necessary for the altitude condition in order to light off the reheat fuel.

In summary therefore, when it is desirable to go on reheat operation to burn the unburned oxygen to provide additional thrust, a metering valve is energized immediately to supply a small amount of fuel to an igniter nozzle for the length of time it takes for the piston 78 to go from left to right or in other words to its down position whereupon it seats. This automatically shuts off the flow of fuel to the igniter nozzle 46. The hot streak of flame lights off the reheat fuel in the afterburner. When it is desirable to go off reheat operation, the pressure is released and the device is provided with a quick return mechanism to return the piston to its original position in as short a time as possible. This feature is very desirable since at any time during the travel of the piston the reheat operation may be discontinued and the piston 78 will return immediately to its original position. In the event that the afterburner does not light off, the reheat throttle is turned off and the piston will return immediately to its original position to provide another attempt at reheat without a large time delay. This is important since the reason for going on reheat operation may be due to an emergency and would require lighting off in the shortest amount of time as possible.

The metering valve gives a more consistent operation since hot streak ignition has proven to be much more satisfactory than other types of ignition. In addition, the metering valve is so constructed and can be so adjusted to require a less time of operation necessary to normally light off. Further, the quick return feature on the piston provides a means for allowing the piston to return to its original position in a relatively short time. In this manner the hot streak is maintained for a minimum time thereby giving more life to the hot portions that are subjected to the hot streak ignition. Also, the construction of the metering valve results in lighter weight, smaller size and is easier to manufacture and maintain over other devices for providing hot streak ignition.

The above description has been given by way of illustration and not by way of limitation, and many minor modifications and changes can be made to the design of the metering valve. However, all of such modifications are intended to be regarded as equivalents and be included within the spirit and scope of this invention.

What I claim as new and desire to secure by Letters Patent of the United States is:

A hot streak ignition system for lighting off reheat fuel in an afterburner of a turbojet engine, comprising a reheat fuel pump, a metering valve and a fuel nozzle arranged in series flow relation, said metering valve including a cylinder having an inlet at one end connected to the reheat fuel pump to receive fuel therefrom; an outlet at the other end connected to the nozzle to discharge fuel thereto; valve seats at each end of the cylinder surrounding the inlet and outlet; a piston assembly positioned within the cylinder and moveable between the inlet and outlet, said assembly including valve portions adapted to bear against the valve seats to seal off the inlet at one end of its travel and seal off the outlet at the other end of its travel; and valve means in the piston assembly exposed to and held in normally closed position by the reheat fuel pump pressure, said valve means being biased to open and transpose fuel from the inlet side to the outlet side of the piston assembly whenever the reheat fuel pump ceases to operate.

References Cited in the file of this patent

UNITED STATES PATENTS

| | | |
|---|---|---|
| 805,498 | Stewart | Nov. 28, 1905 |
| 2,421,810 | Simpson | June 10, 1947 |
| 2,592,486 | Stark | Apr. 8, 1952 |
| 2,640,316 | Neal | June 2, 1953 |
| 2,656,855 | Booth | Oct. 27, 1953 |
| 2,714,803 | Abild | Aug. 9, 1955 |
| 2,715,311 | Coar | Aug. 16, 1955 |
| 2,736,166 | Mock | Feb. 28, 1956 |
| 2,780,055 | Bristol | Feb. 5, 1957 |
| 2,804,241 | McDowall et al. | Aug. 27, 1957 |
| 2,819,587 | Coar | Jan. 14, 1958 |